(12) United States Patent
Koike et al.

(10) Patent No.: US 8,435,610 B2
(45) Date of Patent: May 7, 2013

(54) COPOLYMER OF (METH)ACRYLIC ESTER, COMPOSITION, OPTICAL ELEMENT AND ELECTRIC MEMBER

(75) Inventors: Yasuhiro Koike, Yokohama (JP); Yoshiyuki Okamoto, Fort Lee, NJ (US); Akihiro Tagaya, Yokohama (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 55 days.

(21) Appl. No.: 12/299,157

(22) PCT Filed: Oct. 5, 2006

(86) PCT No.: PCT/JP2006/320360
§ 371 (c)(1),
(2), (4) Date: Oct. 31, 2008

(87) PCT Pub. No.: WO2007/129418
PCT Pub. Date: Nov. 15, 2007

(65) Prior Publication Data
US 2009/0264610 A1    Oct. 22, 2009

Related U.S. Application Data

(60) Provisional application No. 60/797,649, filed on May 5, 2006.

(51) Int. Cl.
*C09K 19/38* (2006.01)
*C08F 18/20* (2006.01)

(52) U.S. Cl.
USPC .......... 428/1.33; 526/245; 526/326; 560/130; 560/221; 560/223

(58) Field of Classification Search ................... 526/245, 526/284, 326; 560/100, 130, 221, 223; 428/1.33
See application file for complete search history.

(56) References Cited

U.S. PATENT DOCUMENTS

| | | | | |
|---|---|---|---|---|
| 4,579,799 A | * | 4/1986 | Katagiri et al. | 430/59.1 |
| 4,803,140 A | * | 2/1989 | Hiro | 430/58.4 |
| 5,223,593 A | * | 6/1993 | McAllister et al. | 526/245 |
| 5,625,021 A | * | 4/1997 | Parusel et al. | 526/329.7 |
| 6,057,409 A | * | 5/2000 | Cunningham et al. | 526/201 |
| 6,313,245 B1 | * | 11/2001 | Moore et al. | 526/243 |
| 6,323,297 B1 | * | 11/2001 | Lee et al. | 526/251 |
| 6,353,069 B1 | * | 3/2002 | Freeman et al. | 526/319 |
| 6,470,131 B1 | * | 10/2002 | Horn et al. | 385/143 |
| 2004/0204555 A1 | * | 10/2004 | Noda et al. | 526/242 |
| 2004/0264908 A1 | | 12/2004 | Calabrese et al. | |

FOREIGN PATENT DOCUMENTS

| | | | |
|---|---|---|---|
| JP | 61-007311 A | | 1/1986 |
| JP | 62208005 A | * | 9/1987 |
| JP | 63-115106 A | | 5/1988 |
| JP | 63-234006 A | | 9/1988 |
| JP | 02 184653 | | 7/1990 |
| WO | WO-88/05060 | | 7/1988 |

OTHER PUBLICATIONS

Translation of Kato et al., JP 62208005, Translated Mar. 2010.*
Boutevin et al., "Accessible New Acrylic Monomers and Polymers as Highly Transparent Organic Materials," *J. Polymer Sci. Part A: Polymer Chem.*, 30:1279-1286 (1992).
Kuo et al., Effects of Copolymer Composition and Free Volume Change on the Miscibility of Poly(styrene-co-vinylphenol) with Poly9(ε-caprolactone), *Macromolecules*, 34:7737-7743 (2001).
Kuo et al., "Thermal Behavior and Specific Interaction in High Glass Transition Temperature PMMA Copolymer," *Polymer*, 44:6873-6882 (2003).
Mishra et al., "Methyl Methacrylate—N-Chlorophenyl Maleimide Copolymers: Effect of Structure on Properties," *J. of Applied Polymer Sci.*, 68:527-534 (1998).
Shaosheng et al., "Study on the Synthesis of Heat-Resistant PMMA," *J. of Applied Polymer Sci.*, 72:1335-1339 (1999).
Tan et al., (2,6-Diphenyl) Phenyl Methacrylate—2. Radical Copolymerization with Methyl Methacrylate. The $T_g$s of its Copolymers with an Addendum on the Polymerization of (2,6-Diphenyl) Phenyl Acrylate, *Eur. Polym. J.*, 30:1363-1366 (1994).
International Search Report and Written Opinion for PCT/JP2006/320360 dated Jan. 19, 2007.
Pearce et al., "Polymer Compatibilization Through Hydrogen Bonding," *J. Macromol. Sci.-Chem.*, A21:1181-1216 (1984).
Partial Translation of Office Action for corresponding Korean Patent Application No. 10-2008-7028074, dated Nov. 16, 2010.
Office Action for Japanese Application No. 2008-550566, dated May 22, 2012.

* cited by examiner

*Primary Examiner* — Mark Eashoo
*Assistant Examiner* — Nicole M Buie-Hatcher
(74) *Attorney, Agent, or Firm* — Marshall, Gerstein & Borun LLP (57) ABSTRACT

A copolymer of (meth)acrylic ester represented by a general formula (1) including a following repeating unit A and repeating unit B. In the general formula (1), $R^1$ and $R^2$ each independently represent hydrogen atom or methyl group; $R^3$ represents an alkyl group having 1 to 4 carbon atoms; Y represents an atomic group forming an aromatic ring; x represents 1 to n, n represents the number of fluorine atoms which can be contained in the aromatic ring; and a and b each independently represent an integer of 1 or more.

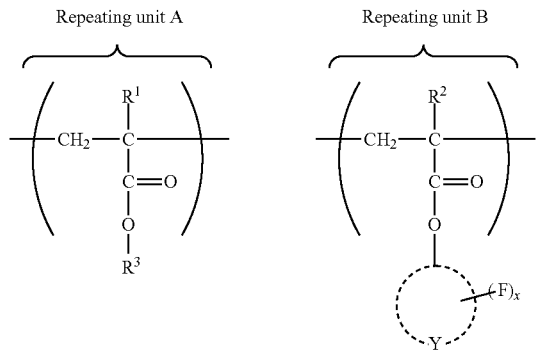

General formula (1)

6 Claims, 5 Drawing Sheets

COPOLYMER OF (METH)ACRYLIC ESTER, COMPOSITION, OPTICAL ELEMENT AND ELECTRIC MEMBER

TECHNICAL FIELD

The present invention relates to a novel copolymer of methacrylic ester, a composition, an optical element, and an electric member.

BACKGROUND ART

Polymethyl methacrylate (PMMA) is a commercially mass-produced important polymer which is colorless and which has a high light transmittance, excellent chemical resistance and excellent weather corrosion resistance. PMMA is widely used as a substitute for glass in optical device applications. However, the glass transition temperature of PMMA is relatively low, e.g., about 100° C. and has a moisture absorption property. These properties limit the utility of PMMA for optical electronic applications.

In order to increase the glass transition temperature (Tg) of PMMA, there have been investigated the incorporation of rigid or bulky monomers through copolymerization as described in: Y. Tan, G. Ekenstein, Eur. Polym. J. 1994, 30, 1363; A. Mishra, T. Sinha, V. Choudhary, J. Appl. Polym. Sci. 1998, 68, 527; and S. Dong, Q. Wang, Y. Wei, Z. Zhang, J. Appl. Polym. Sci. 1999, 72, 1335, and the incorporation of monomers having groups that can form a hydrogen-bonding interaction with the carbonyl group of PMMA as described in: E. M. Pearce, T. K. Kwei, B. Y. Min, J. Macromol. Sci. Chem. 1984, 21, 1181; S. Kuo, F. Chang, Macromolecules 2001, 34, 7737; and S. Kuo, H. Kao, F. Chang, Polymer 2003, 44, 6873. The moisture absorption of PMMA has been also reported to decrease by copolymerization of methyl methacrylate with bulky cyclic hydrocarbon substituted methyl acrylates.

However, these modifications with bulky groups tend to decrease the transparency of PMMA due to light absorption of the co-monomer added.

For PMMA in the visible region, intrinsic light transmittance losses are dominated by overtone stretches of C—H stretching vibration and by a combination of overtone stretches and deformation vibration. When heavier atoms such as deuterium and fluorine replace the hydrogen atom of C—H bond, the vibration absorption energy increases, and the absorption band is thereby minimized in a region ranging from the visible region to the near-infrared region.

Consequentially, Bontevin and coworkers have prepared several fluorine substituted acrylate monomers and have reported that their polymers are highly transparent organic materials (B. Bontevin, A. Rousseau, D. Bosc, J. Polym. Sci. Pol. Chem. 1992, 30, 1279). Among these fluorine-substituted acrylate monomers, pentafluorophenyl methacylate (PFPA) and its polymer were reported in terms of refractive indexes thereof. Further, the glass transition temperature (Tg) of poly(PFPA) was reported to be 125° C., which is about 20° C. higher than that of PMMA.

DISCLOSURE OF INVENTION

The present invention has been made in view of the above circumstances, and have achieved good results at obtaining the following novel copolymer of methyl(meth)acrylate. That is to say, the present invention will be described hereinafter.

The first aspect of the preset invention is a copolymer of (meth)acrylic ester represented by a general formula (1) including the following repeating unit A and repeating unit B;

General formula (1)

wherein: $R^1$ and $R^2$ each independently represent hydrogen atom or methyl group; $R^3$ represents an alkyl group having 1 to 4 carbon atoms; Y represents an atomic group forming an aromatic ring; x represents an integer of 1 to n, n represents the number of fluorine atoms which can be contained in the aromatic ring.

The second aspect of the present invention is the copolymer according to the first aspect, wherein the aromatic ring formed by the atomic group represented by Y is phenyl group or naphthyl group.

The third aspect of the present invention is the copolymer according to the first aspect, wherein $R^1$ and $R^2$ are each independently a methyl group.

The fourth aspect of the present invention is the copolymer according to the first aspect, wherein the repeating unit B is formed by at least one selected from the group consisting of 2,3,5,6-tetrafluorophenyl methacrylate, pentafluorophenyl methacrylate, p-trifluoromethyl tetrafluorophenyl methacrylate and β-perfluoronaphthyl methacrylate.

The fifth aspect of the present invention is the copolymer according to the first aspect, wherein the molar ratio between repeating unit A and repeating unit B is 60:40 to 90:10.

The sixth aspect of the present invention is the copolymer according to the first aspect, wherein the molar ratio between repeating unit A and repeating unit B is 90:10 to 95:5.

The seventh aspect of the present invention is a composition comprising the copolymer according to any one of the first aspect to sixth aspect.

The eighth aspect of the present invention is an optical member comprising the copolymer according to the first aspect to sixth aspect.

The ninth aspect of the present invention is an electric member comprising the copolymer according to the first aspect to sixth aspect.

BEST MODE FOR CARRYING OUT THE INVENTION

The present invention provides a copolymer of (meth)acrylic ester represented by general formula (1) including the following repeating units A and B (which copolymer will be occasionally referred to hereinafter as a "copolymer of the present invention").

General formula (1)

In the general formula (1), $R^1$ and $R^2$ each independently represent hydrogen atom or methyl group, and $R^3$ represents an alkyl group having 1 to 4 carbon atoms. Y represents an atomic group that forms an aromatic ring, x represents an integer of 1 to n, n represents the number of fluorine atoms that can be contained in the aromatic ring.

As described above, a copolymer is prepared which contains: the repeating unit A derived from methyl methacrylate (MMA) or methyl acrylate (MA) (these two substances will occasionally be hereinafter referred to collectively as "methyl (meth)acrylate"); and the repeating unit B derived from a monomer of a methacrylic ester or an acrylic ester of a fluorine-substituted aromatic group (these two esters will occasionally be hereinafter referred to collectively as "(meth) acrylic ester of a fluorine-substituted aromatic group"), thereby resulting in that the thermo resistance thereof is further improved than that of polymethyl methacrylate (PMMA) or polymethyl acrylate (PMA) and the moisture absorption property thereof is reduced. Further, the copolymer exhibits a high degree of transparency.

In order to prepare a polymer having improved thermo resistance and reduced moisture absorption, and also having a lower birefringence and a higher degree of transparency as compared to a homopolymer such as PMMA or PMA, the present inventors have found it clear that it is extremely effective to cause the repeating unit B to be included in a polymer skeleton, that is to say, to carry out copolymerization of a monomer of (meth)acrylic acid ester of a fluorine-substituted aromatic group.

It is contemplated that when an aromatic group such as benzene ring or naphthalene ring is fluorinated, π-electrons that constitute of the rings are attracted by a fluorine atom having the largest electronegativity, thereby causing polarization to reduce a electron density in a center portion of the ring. Further, it is also contemplated that the aforementioned polarization causes the ring structure to undergo an interaction with carbonyl group of MMA, thereby resulting in that the glass transition temperature of the copolymer of the present invention is enhanced.

Accordingly, the thermo resistance is remarkably improved even by introduction of a small amount of the fluorinated aromatic group. Therefore, the thermo resistance can be improved without impairing the properties of general-purpose PMMA or PMA (for example, the transparency, mechanical strength and the like).

Further, the introduction of the fluorinated structure into the polymer has an effect of enhancing the hydrophobic property and reducing the moisture absorption property. However, the fluorinated polymer having no bulky side chain, such as Teflon (registered trademark), typically has a high degree of crystallinity and causes the transparency of the polymer to become lower. Such drawbacks of the fluorinated polymer as described above can also be solved by introduction of the fluorinated ring structure into the side chain of the polymer.

Further, even when (meth)acrylic ester of a fluorine-substituted aromatic group, and one of MMA and MA are copolymerized, a copolymer to be obtained has a high degree of transparency and does not impair the transparency of PMMA or PMA.

Additionally, even if the copolymer is a block copolymer in which the repeating unit A and the repeating unit B are present in clusters without causing copolymerization in a random order, or even if a monomer remains without reacting, the (meth)acrylic ester of a fluorine-substituted aromatic group and its polymer have refractive indexes which are very close to refractive indexes of MMA and PMMA. Therefore, the transparency of the copolymer to be obtained is not deteriorated.

Moreover, the investigation made by the present inventors also clears that a homopolymer of pentafluorophenyl methacrylate (PFPA) has a birefringence larger than that of PMMA, and is of fragile nature having a low mechanical strength.

As the principal birefringence often observed in the polymers in optical applications, orientational birefringence and photoelastic birefringence are known. The orientational birefringence occurs due to the orientation of a main chain of a chain polymer molecule. In a general molding method of polymers, such as injection molding, extrusion molding, hot stretching or the like, the orientational birefringence is apt to occur in a process of melting or molding polymers. The photoelastic birefringence is one that occurs when the polymer elastically deforms. In the transparent polymers in optical applications, the photoelastic birefringence occurs mainly at the time when distortion is generated at the temperature equal to or lower than the glass transition temperature of the polymer. For example, in an optical film for a liquid crystal display, all sides of a film applied to an image plane, that is, a peripheral portion of the image plane is mechanically fixed. The film expands and contracts depending on variations in ambient temperature and humidity at the time of using the liquid crystal display, and therefore, distortion is generated in the film. As a result, the photoelastic birefringence appears. As the birefringence becomes larger, the image quality of the liquid crystal display is remarkably deteriorated. The motion of the polymer chain observed on the molecular level at the time when the photoelastic birefringence appears has not yet been clarified specifically. However, this birefringence appearing at the glass transition temperature or less is often based on a mechanism that causes orientation of a side chain in a state in which the main chain of the polymer molecule almost never move. In other words, the aforementioned orientational birefringence is one caused by orientation of the main chain of a polymer molecule, and the photoelastic birefringence is one caused by, mainly, orientation of the side chain of the polymer molecule.

The polymer normally has either positive or negative birefringence, which is derived from the chemical structure of the polymer. Therefore, the birefringence is the property inherent in the type of the polymer. The magnitude of the orientational birefringence depends on the birefringence inherent in the polymer, and on the orientation of the polymer chain. The magnitude of the photoelastic birefringence depends on the birefringence inherent in the polymer, and on the degree of distortion. As described above, the orientational birefringence and photoelastic birefringence have different mechanisms of appearing. Therefore, in the same polymer as well, the intrinsic orientational birefringence and the intrinsic photoelastic birefringence become different from each other.

The intrinsic orientational birefringences are measured and compared with various polymers at a fixed degree of orientation of polymer main chain. The intrinsic photoelastic birefringences can be compared with various polymers by photoelastic constants (occasionally referred to as photoelastic coefficients) of the various polymers.

PMMA of the homopolymer obtained by polymerization of MMA is shown negative both in the orientational birefringence and in the photoelastic birefringence. Accordingly, it can be seen that MMA is a monomer that exhibits a negative effect both in the orientational birefringence property and in the photoelastic birefringence property.

To the contrary, the homopolymer of (meth)acrylic ester of a fluorine-substituted aromatic group is shown positive both in the orientational birefringence and in the photoelastic birefringence, and respective absolute values of the orientational birefringence and photoelastic birefringence of this homopolymer are larger than those of PMMA.

Concretely, the orientational birefringence of PMMA is about $-1 \times 10^{-4}$ when the degree of orientation of the main chain is about 0.03, and the photoelastic birefringence of PMMA is about $-5 \times 10^{-12}$ [$Pa^{-1}$]. Meanwhile, the orientational birefringence of polyPFPA is about $5 \times 10^{-4}$ when the degree of orientation of the main chain is about 0.03, and the photoelastic birefringence thereof is about $35 \times 10^{-12}$ [$Pa^{-1}$].

It is supposed that, due to introducing the fluorinated aromatic ring structure into the side chain of the polymer, the motion of the side chain, at the time when the orientational birefringence appears and at the time when the photoelastic birefringence appears, is determined, thereby resulting in that the orientational birefringence and orientational birefringence of the polyPFPA are both positive.

The copolymer of the present invention has the repeating unit A that exhibits a negative birefringence, and the repeating unit B that exhibits a positive birefringence, and therefore, the positive and negative birefringences compensated. As a result, the degree of birefringence can be reduced, so that the copolymer can be also formed of a non-birefringence material.

Further, there are cases in which a material having a specific birefringence is required depending on applications. A copolymer having a desired birefringence can be obtained by varying the composition ratio between the repeating unit A that exhibits a negative birefringence and the repeating unit B that exhibits a positive birefringence. The birefringence value of the copolymer can be adjusted within a wide range between the birefringence value of the homopolymer only comprised of the repeating unit A, and the birefringence value of the homopolymer only comprised of the repeating unit B.

The copolymer of the present invention represented by the general formula (1) will be hereinafter described in detail.
<Repeating Unit A>

The copolymer of the present invention has the following repeating unit A.

Repeating unit A

In the repeating unit A, $R^1$ represents hydrogen atom or methyl group. That is to say, the repeating unit A is formed by copolymerization of alkyl methacrylate or alkyl acrylate. The repeating unit A may also be formed by using methyl methacrylate and methyl acrylate at the same time.

From the standpoint of transparency or general purpose, the repeating unit A is preferably formed by methyl methacrylate.

In the repeating unit A, $R^3$ represents an alkyl group having 1 to 4 carbon atoms, specifically, methyl group, ethyl group, propyl group, or butyl group.
<Repeating Unit B>

The copolymer of the present invention has the following repeating unit B.

Repeating unit B

In the repeating unit B, $R^2$ represents hydrogen atom or methyl group, preferably methyl group from the standpoint of transparency.

In the repeating unit B, Y represents an atomic group that forms a monovalent aromatic ring, preferably carbon ring. Examples of such aromatic ring include phenyl group, naphthyl group and the like.

In the present invention, at least one of the hydrogen atoms in the aromatic ring are substituted by fluorine atoms. When the number of hydrogen atoms which can be included in the aforementioned monovalent aromatic ring is n, the number of substituted by fluorine atoms, "x", is 1 to n, preferably (n−2) to n, and more preferably (n−1) to n.

Specifically, in the case of a phenyl group (n=5), x is preferably 3 to 5, and more preferably 4 or 5. Further, in the case of a naphthyl group (n=7), x is preferably 5 to 7, and more preferably 6 or 7.

The hydrogen atoms which are not substituted by fluorine atoms in the monovalent aromatic ring may be existed in the state of hydrogen atoms, or may be substituted by perfluoroalkyl group. The perfluoroalkyl group is preferably a perfluoroalkyl group having 1 to 3 carbon atoms, and trifluoromethyl group, pentafluoroethyl group, heptafluoroisopropyl group and the like are preferably used.

The repeating unit B is formed by copolymerization of (meth)acrylic ester of a fluorine-substituted aromatic group. Examples of the (meth)acrylic ester of a fluorine-substituted aromatic group include 2,3,5,6-tetrafluorophenyl methacrylate (TFPA), pentafluorophenyl methacrylate (PFPA), p-trifluoromethyl tetrafluorophenyl methacrylate (TTFPA), β-perfluoronaphthyl methacrylate (PFNA) and the like. In addition, specific examples of the (meth)acrylic ester of a fluorine-substituted aromatic group are shown below as constitutional formulae, but the present invention is not limited thereto.

The repeating unit B may be formed using one type of the aforementioned (meth)acrylic ester of a fluorine-substituted aromatic group, or using two or more types thereof. That is to say, the copolymer represented by the general formula (1) may be obtained by copolymerization of two types of (meth)acrylic esters or by copolymerization of three or more types of (meth)acrylic esters.

<Other Repeating Units>

The copolymer of the present invention may also contain, in addition to the repeating units A and B, other repeating units. These repeating units may not be particularly limited as long as they can be formed by radical polymerization. For example, a repeating unit formed by a polymerizable compound having an ethylenic unsaturated bond can be exemplified.

Specific examples of the polymerizable compound having an ethylenic unsaturated bond include alkyl acrylate such as 2-ethylhexyl acrylate, 2-hydroxyethyl acrylate or isobornyl acrylate. Further, silicon acrylate and the like can also be exemplified. Other examples thereof include acrylonitrile, an acrylamide, a methacrylamide, an N-substituted (meth)acrylamide, a vinyl ester such as vinyl acetate, vinyl ether such as isobutyl vinyl ether, styrene, alkyl or halostyrene, N-vinyl pyrrolidone, vinyl chloride or vinylidene chloride.

The content ratio of the other repeating units is preferably 6 mol % or less, more preferably 3 mol % or less with respect to the copolymer of the present invention. Particularly preferably, the other repeating units are not substantially contained from the standpoint of the physical properties such as transparency and the like.

<Copolymer>

From the overall standpoint of preparing a copolymer that has a low moisture absorption, and does not deteriorate the transparency, and has a low birefringence and also exhibits a high thermo resistance, as long as the copolymer contains the repeating unit A formed by MMA or MA and the repeating unit B formed by (meth)acrylic ester of a fluorine-substituted aromatic group, the ratio of copolymerization between these repeating units is not particularly limited. However, with particular emphasis on the thermo resistance and the moisture absorbing property, the ratio of polymerization between the repeating unit A and the repeating unit B is preferably set such that (repeating unit A: repeating unit B)=99 mol %:1 mol % to 1 mol %:99 mol %, and more preferably 60 mol %:40 mol % to 90 mol %:10 mol %, furthermore preferably 70 mol %:30 mol % to 90 mol %:10 mol %. Furthermore, also with emphasis on the mechanical properties and cost factor, the ratio of polymerization is further preferably set such that 95 mol %:5 mol % to 70 mol %:30 mol %, and particularly preferably 95 mol %:5 mol % to 90 mol %:10 mol %.

In the case of the copolymer obtained by copolymerization of MMA and PFPA, with the birefringence being emphatically considered, the ratio of polymerization between MMA and PFPA is preferably set such that MMA:PFPA=59 wt %:41 wt % to 99 wt %:1 wt % relative to the total weight of the copolymer so as to reduce both the orientational birefringence and photoelastic birefringence, more preferably MMA:PFPA=76 wt %:24 wt % to 95 wt %:5 wt %, and further preferably MMA:PFPA=79 wt %:21 wt % to 89 wt %:11 wt %.

The copolymer of the present invention may be either a random copolymer or a block copolymer, having the repeating unit A and the repeating unit B (and also the other repeating unit). From the standpoint of the transparency of the copolymer, the random copolymer is preferable.

<Production Method of Copolymer>

Methyl methacrylate and fluorine-substituted aromatic acrylate can be copolymerized by radical polymerization.

As an initiator of radical polymerization, commonly used initiators, for example, azo compounds such as phenylazo (triphenyl)methane, azoisobutylonitrile (AIBN), azobisvaleronitrile and azobis(2-methylpropionitrile); peroxides such as cumene hydroperoxide (CHP), benzoyl peroxide (BPO), acetyl peroxide, lauroyl peroxide (LP), tert-butyl hydroperoxide (BHP), di-tert-butyl hydroperoxide (DBP), and tert-butylperoxy-2-ethyl hexanol; persulfate potassium, persulfate ammonium and the like can be used singly or in a combination of two or more.

As the polymerization method, general methods which are applicable in carrying out radical polymerization, such as bulk polymerization, solution polymerization, suspension polymerization or emulsion polymerization, can be employed. Among them, the bulk polymerization, solution polymerization, or suspension polymerization is suitably applied from the standpoint of preventing deterioration of the transparency of the polymer by contamination of impurities and preventing coloring by heat.

When the solution polymerization is employed, common organic solvents, for example, toluene, benzene, xylene, butyl acetate, methyl ethyl ketone and ketones such as methyl isobutyl ketone, tetrahydrofuran (THF) and dioxane can be used as a reaction solvent. Further, it is preferable that prior to using these organic solvents, and then bubbling is carried out by injecting nitrogen gas for approximately 30 minutes to one hour in advance.

The reaction solvent is used such that the content ratio of the monomer is preferably in the range of 40% by mass or less, more preferably in the range of 20% by mass or less.

In a case in which the molecular weight of the copolymer to be obtained becomes much higher so that it would become insoluble in the organic solvent, a chain transfer agent is preferably used. As the chain transfer agent, well known compounds, for example, sulfur-containing compounds such as dodecanthiol (n-$C_{12}H_{25}SH$), propanethiol (n-$C_4H_9SH$) and butanethiol, carbon tetrabromide and halogen compounds such as monochlorotribromocarbon, and the like can be used.

The amount of the chain transfer agent added is preferably 2% by mass to 10% by mass, more preferably 3% by mass to 5% by mass relative to the total mass of the monomer.

<Application>

The copolymer of the present invention exhibits a low moisture absorbing property, a low birefringence, and a high glass transition temperature (high thermo resistance) as compared to the general-purpose PMMA, and also has the same degree of transparency as that of PMMA. In the copolymer of the present invention, the aforementioned repeating unit B is introduced as a moiety of PMMA or PMA, and even if the amount thereof introduced is small, the thermo resistance can be improved. Therefore, there is no possibility that the excellent properties of PMMA or PMA (the transparency, mechanical strength and the like) are damaged. Further, if the amount of the repeating unit B introduced within the aforementioned range, a practically sufficient mechanical strength can be realized.

Accordingly, the copolymer of the present invention can be efficiently used as an alternative for conventional applications of PMMA, and can be suitably used for applications including an optical device such as a video disk, a compact disk, various lenses including a pick-up lens; optical members such as an optical fiber or a light guided wave. For further details, the copolymer of the present invention can also be suitably applied to various functional optical films for a liquid crystal display (a deflection plate protective film, a phase contrast film and the like), diffusion plates for a liquid crystal display, a rear projection TV and the like, a light guide wave plate for a liquid crystal display, various functional optical films for back-lighting of a liquid crystal display (a prism sheet, a diffusion sheet and the like), and the like.

Further, the copolymer of the present invention can be suitably applied to electric members in such a manner as to be used for an electronic component such as a connector, or for a molded portion such as a case body of a cell phone, or used for a sealant for a semiconductor with a crosslinking agent added thereto. An example of a sealing material by which optical properties are required is a round portion of a round type LED.

<Composition>

The copolymer of the present invention can be suitably used for the aforementioned applications, and the compositions thereof are prepared for each of the applications.

For applications as the sealing member, the compositions may contain the copolymer of the present invention and a crosslinking agent. For application as the various films, the compositions may contain the copolymer of the present invention and a solvent in which the copolymer is soluble. Examples of the solvent in which the copolymer of the present invention is soluble include hexafluorobenzene, chloroform, methylene chloride, tetrahydrofuran and the like. For applications as lenses or optical fiber, the compositions may contain the copolymer of the present invention and a low-molecular-weight organic compound that increases or decreases the refractive index thereof.

EXAMPLES

Next, the present invention will be described in detail by way of examples, but it is not limited thereto.

Example 1

Methyl methacrylate (MMA), methacryloyl chloride, pyridine, diethyl ether, chloroform and azobisisobutyronitrile (AIBN) were purchased from Aldrich Corporation. Pentafluorophenol and 2,3,5,6-tetrafluorophenol were purchased from SynQuest Corporation. MMA was purified by distillation under vacuum prior to use. Diethyl ether was distilled with calcium hydride (CaH$_2$), and the free radical initiator AIBN was purified by recrystallization from methanol.

Pentafluorophenol, 2,3,5,6-tetrafluorophenol, pyridine and the like were used directly without further purification.

Synthesis of 2,3,5,6-tetrafluorophenyl methacrylate (TFPA)

50 g of 2,3,5,6-tetrafluorophenol (0.30 mol) was dissolved in 800 ml of diethyl ether. After cooling the solution with ice and water, 24 g of pyridine (0.30 mol) was added slowly thereof, and then the ether solution (400 ml) of 32 g of methacryloyl chloride (0.31 mol) was dropped slowly into the above cooled solution.

There formed a white precipitate, which is the salt of pyridine and hydrogen chloride produced from the reaction. After five hours at room temperature, the reaction was stopped, and the white precipitate was filtered off and washed with ether. The combined ether solution was washed with 3% by mass aqueous hydrochloride acid, saturated sodium chloride aqueous solution, and then 3% by mass sodium bicarbonate solution. After drying with anhydrous magnesium sulfate, the ether solution was filtered and concentrated with a rotary evaporator.

A colorless liquid was obtained and was distilled at 61° C./5 mmHg with a yield of 80%.

$^1$HNMR (CDCl$_3$): 2.1 (s, 3H), 5.9 (s, 1H), 6.5 (s, 1H), 7.0 (m, 1H).

$^{13}$CNMR (CDCl$_3$): 19, 103, 130, 131, 134, 141, 146, 163.

$^{19}$FNMR (CDCl$_3$): −140 (s, 2F), −154 (s, 2F).

Synthesis of Phenyl Methacrylate (phMA) and Pentafluorophenyl Methacrylate (PFPA)

Phenyl methacrylate (phMA) and pentafluorophenyl methacrylate (PFPA) were prepared using the method similar to that for synthesis of TFPA as described above.
(phMA)
  Boiling point: 69° C./1 mmHg.
  $^1$HNMR (CDCl$_3$): 1.9 (s, 3H), 5.5 (s, 1H), 6.0 (s, 1H), 7.2 (m, 1H).
  $^{13}$CNMR (CDCl$_3$): 18, 122, 126, 128, 129, 135, 151, 166.
(PFPA)
  Boiling point: 56° C./3.0 mmHg.
  $^1$HNMR (CDCl$_3$): 2.1 (s, 3H), 5.9 (s, 1H), 6.5 (s, 1H), 7.0 (m, 1H)
  $^{13}$CNMR (CDCl$_3$): 19, 103, 130, 131, 134, 141, 146, 163.
  $^{19}$FNMR (CDCl$_3$): −140 (s, 2F), −154 (s, 2F)

<Polymerization>

AIBN (1 mol % with respect to monomers) was employed as an initiator. The monomer mixtures prepared as described above were transferred into a glass polymerization tube, which was subjected to repeated freeze-pump-thaw cycles and sealed under vacuum. After polymerization was carried out under controlling 60° C. with a thermostat, the glass tube was opened and the contents were poured into a large amount of methanol with vigorous stirring to precipitate the polymer.

After drying under vacuum at 50° C. for 24 hours, polymer samples were re-precipitated from the chloroform solution using methanol. The purified polymer samples were dried under vacuum at 50° C. for 48 hours.

$^1$H, $^{13}$C, $^{19}$F NMR spectra of the polymer samples thus obtained were taken using a Bruker ACF 300 spectrometer (300 MHz for $^1$HNMR, and 75 MHz for $^{13}$CNMR measurement). $^{19}$FNMR spectra was observed at frequency 282 MHz with trichlorofluoromethane as a standard.

Molecular weights and molecular weight distributions were determined by gel permeation chromatography (GPC) (Water 510, Waters-Wyatt GPC system) using chloroform as an eluent at a flow rate of 1.0 ml/min. The molecular weight calibration curve was obtained using polystyrene standards.

The glass transition temperature (Tg) of polymers was determined using a DSC 2920 Model with the TA Instrument 5100 system, with a scan rate of 10° C./min within a temperature range of 30 to 180° C.

The measurement was made using a sample of 5 to 10 mg and Tg was taken in the second heating scan as the midpoint of the heat capacity transition between the upper and lower points of deviation from the extrapolated liquid and glass lines.

The polymer films each having a thickness of 0.1 to 0.2 mm produced by casting their hexafluorobenzene solutions on glass plates were used to measure the refractive index thereof. A prism coupler (Metricon, Model 2010) was utilized. The measurement accuracy was ±0.0005. The probe wavelengths of refractive indexes in the prism were 532, 632, 839 and 1544 nm, respectively.

<Results>

The copolymerization of methyl methacrylate (MMA) and PFPA was carried out by bulk polymerization without addition of any chain transfer agent. All the copolymers thus obtained were soluble in chloroform.

The copolymerization of MMA and a fluorine-substituted acrylate was carried out with various monomer-feeding ratios. Table 2 shows the compositions, number average molecular weight (Mn), weight average molecular weight (Mw), and Tg of the polymer.

TABLE 2

| Samples | PFPA in monomer mixture (mol %) | PFPA in copolymer (mol %) | Mn (×10$^4$) | Mw (×10$^4$) | Tg (° C.) |
|---|---|---|---|---|---|
| 10 | 11 | 14 | 12.42 | 31.49 | 115 |
| 11 | 19 | 25 | 15.60 | 33.42 | 123 |
| 12 | 35 | 47 | 18.69 | 40.18 | 129 |

<Refractive Index>

Figure 1A:
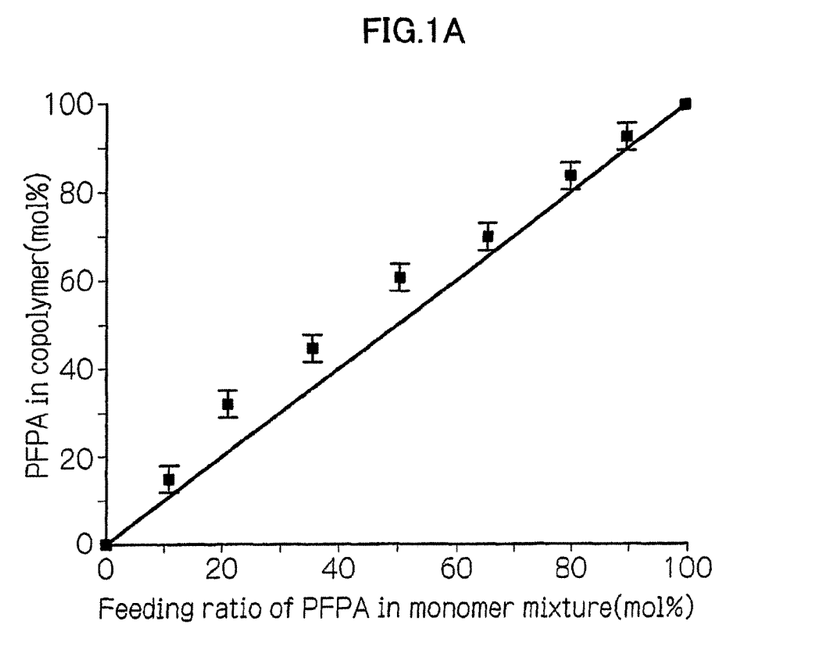
FIG. 1A is a graph showing the content ratio of PFPA in a copolymer of methyl methacylate (MMA) and pentafluorophenyl methacrylate (PFPA) when the feeding ratio of PFPA is changed in an embodiment of the invention.

The copolymerization of methyl methacrylate (MMA) and PFPA were carried out with various monomer-feeding ratios. In order to determine reactivity ratios of monomers, the conversion of polymerization reaction of the polymer was controlled so as to be 10 wt % or less. The conversion mentioned herein is an index that represents a polymerization rate (%) with an initial monomer being indicated as 100%. The copolymer compositions were determined by $^1$H-NMR measurement and calculated according to Kelen-Tudos method. The compositions, Tg and refractive indexes of the polymers obtained are shown in Table 3, and the data are plotted in FIG. 1A and FIG. 1B.

TABLE 3

| Samples | PFPA in monomer mixture (mol %) | PFPA in copolymer (mol %) | Tg (° C.) | Refractive index 532 nm | Refractive index 839 nm | Remarks |
|---|---|---|---|---|---|---|
| 20 | 0 | 0 | 105 | 1.4953 | 1.4852 | Comparative example |
| 21 | 10 | 15 | 119 | 1.4936 | 1.4835 | Present invention |

TABLE 3-continued

| Samples | PFPA in monomer mixture (mol %) | PFPA in copolymer (mol %) | Tg (° C.) | Refractive index 532 nm | Refractive index 839 nm | Remarks |
|---|---|---|---|---|---|---|
| 22 | 20 | 32 | 121 | 1.4927 | 1.4827 | Present invention |
| 23 | 50 | 61 | 123 | 1.4863 | 1.4809 | Present invention |
| 24 | 100 | 100 | 125 | 1.4894 | 1.4763 | Comparative example |

With regard to a monomer reactivity ratios in the copolymerization between PFPA and MMA, $r_1$ (PFPA) and $r_2$ (MMA), were found to be 1.2 and 0.5, respectively. The monomer reactivity ratio mentioned herein represents the reactivity of each of the monomers in the copolymerization. For example, consider the copolymerization between the monomer 1 and the monomer 2. When attention is focused on the growth radical at a certain moment (with radical polymerization reaction, one polymer chain that is in the course of growing, with a radical present at the end thereof), the end is the radical of the monomer 1 or monomer 2. If the end is the radical of the monomer 1, assuming that the reaction rate constant when the monomer 1 is continuously added to the end by reaction is represented by $k_{11}$, and the reaction rate constant when the monomer 2 is added by reaction is represented by $k_{12}$, the expression $r_1=k_{11}/k_{12}$ is defined. When the end of the growth radical is the monomer 2, assuming that the reaction rate constant when the monomer 2 is continuously added to the end by reaction is represented by $k_{22}$, and the reaction rate constant when the monomer 1 is added by reaction is represented by $k_{21}$, the following expression $r_2=k_{22}/k_{21}$ is defined. It is possible to theoretically estimate which type of copolymerization composition based on the combination of $r_1$ and $r_2$. The results indicated that these monomers exhibit excellent copolymerization and form a substantially ideal random copolymer.

Figure 1B:
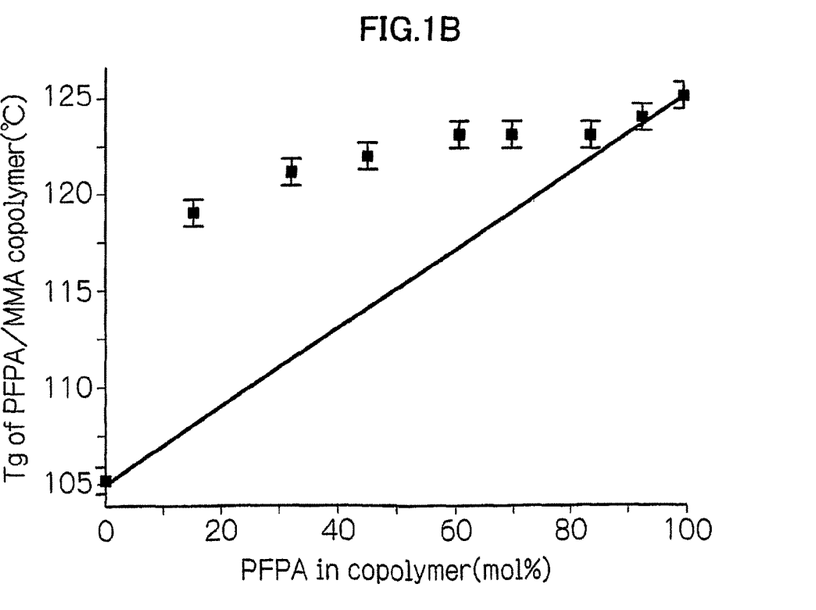
FIG. 1B is a graph showing variations in Tg of the MMA/PFPA copolymer when the feeding ratio of PFPA in the copolymer is changed in the embodiment.

As compared to the case in which Tg was 105° C. when the PFPA composition in the copolymer was 0 mol %, that is to say, when it was the homopolymer of PMMA, all of the copolymers in the samples 21 to 23 exhibits an increase of Tg. Particularly, as shown in FIG. 1B, the rate of increase in Tg is significantly high due to the introduction of a small amount of PFPA.

On the other hand, it can be seen that all of the copolymers in the samples 21 to 23 have substantially the same refractive index as that of PMMA.

Further, in the sample 24 in which the PFPA composition in the copolymer is 100 mol %, that is, in the homopolymer of PFPA, Tg increased to 125° C., but it was of fragile nature having a low mechanical strength.

Figure 2A:
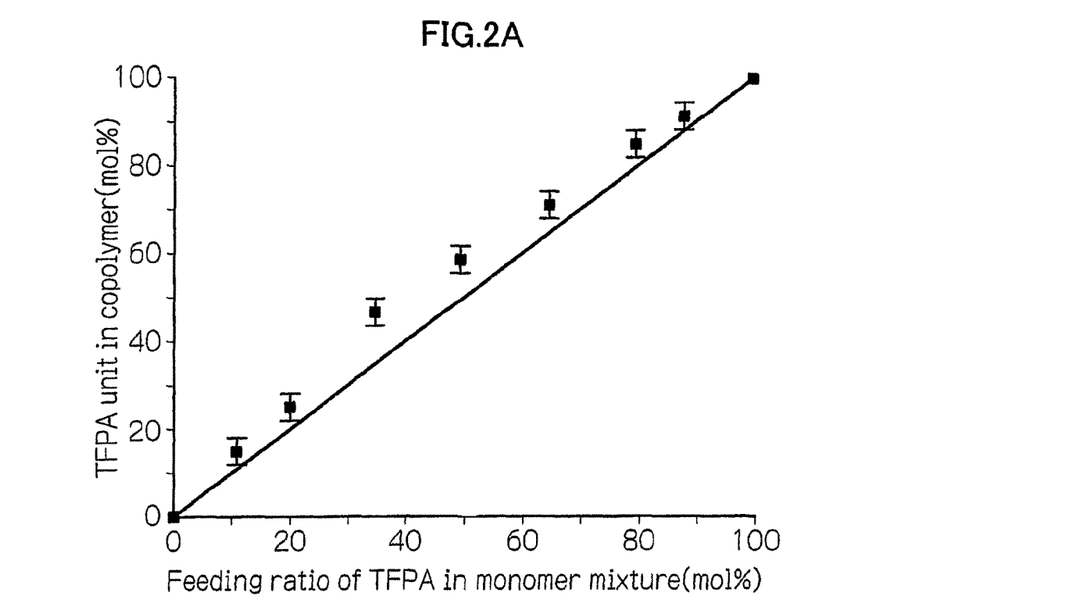
FIG. 2A is a graph showing the content ratio of TFPA in a copolymer of MMA and 2,3,5,6-tetrafluorophenyl methacrylate (TFPA) when the feeding ratio of TFPA is changed in the embodiment.

Next, the copolymerization of methyl methacryalte (MMA) and TFPA was carried out with various monomer-feeding ratios. The results are shown in Table 4, and the data are plotted in FIG. 2A and FIG. 2B.

TABLE 4

| Samples | TFPA in monomer mixture (mol %) | TFPA in copolymer (mol %) | Tg (° C.) | Refractive index 532 nm | Refractive index 839 nm | Remarks |
|---|---|---|---|---|---|---|
| 30 | 0 | 0 | 105 | 1.4953 | 1.4852 | Comparative example |
| 31 | 11 | 14 | 115 | 1.4956 | 1.4853 | Present invention |
| 32 | 35 | 41 | 129 | 1.4968 | 1.4859 | Present invention |
| 33 | 89 | 92 | 134 | 1.4927 | 1.4862 | Present invention |
| 34 | 100 | 100 | 135 | 1.4992 | 1.4860 | Comparative example |

The monomer reactivity ratios, $r_1$ (TFPA) and $r_2$ (MMA) were found to be 1.5 and 0.77, respectively, and $r_1 r_2$ equals to 1.1. The results indicated that these monomers each exhibit excellent copolymerization and form substantially an ideal random copolymer.

Figure 2B:
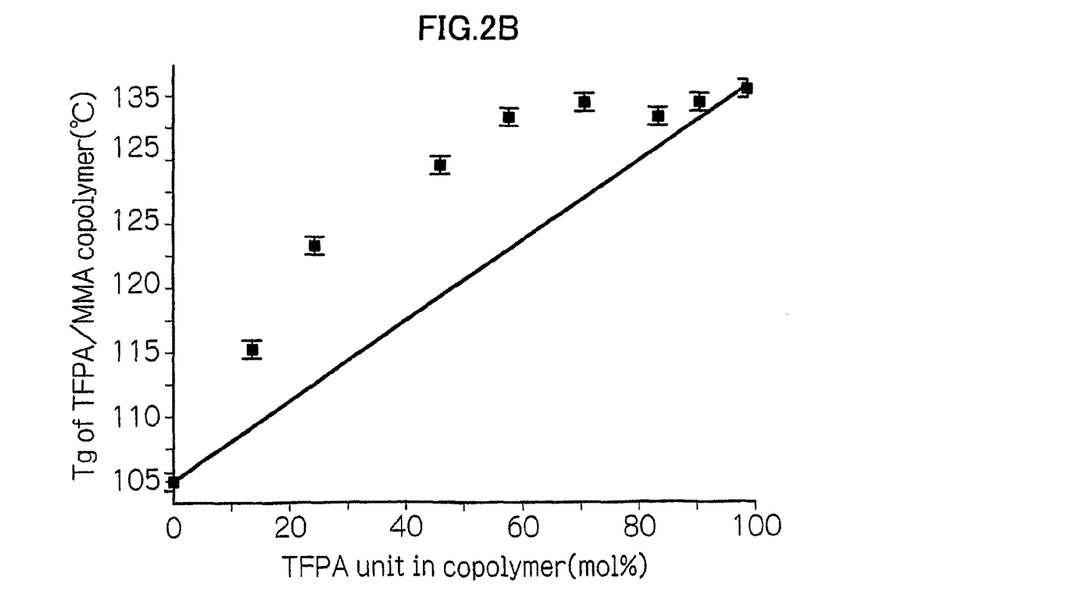
FIG. 2B is a graph showing variations in Tg of the MMA/TFPA copolymer when the feeding ratio of TFPA in the copolymer is changed in the embodiment.

As compared to the case in which Tg was 105° C. when the TFPA composition in the copolymer was 0 mol %, that is to say, when it was the homopolymer of PMMA, all of the copolymers in the samples 31 to 33 exhibits an increase of Tg. Particularly, as shown in FIG. 2B, the rate of increase in Tg is significantly high due to the introduction of a small amount of TFPA.

On the other hand, it can be seen that all of the copolymers in the samples 31 to 33 have substantially the same refractive index as that of PMMA.

Further, in the sample 34 in which the TFPA composition in the copolymer is 100 mol %, that is, in the homopolymer of TFPA, Tg increased to be 135° C., but it was of fragile nature having a low mechanical strength.

The results indicated that Tg of this copolymer increased, but this copolymer can maintain the same degree of transparency as that of PMMA.

(Moisture Absorbing Property)

In the copolymer of the aforementioned sample 22 (feeding ratio of PFPA and MMA=20 mol %:80 mol %), a sample of 30 mm×30 mm×2 mm was produced, and placed in an environment having the temperature of 60° C. and the humidity of 60% RH. The variations over time of the amount of water absorption were measured. The results are shown in FIG. 3.

Figure 3:
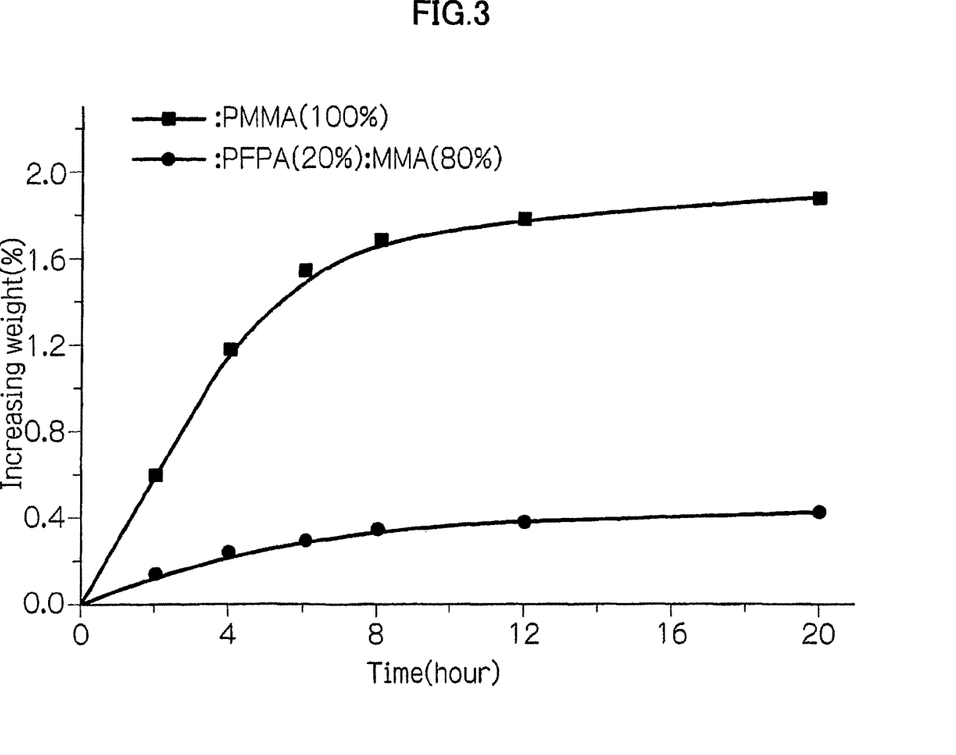
FIG. 3 is a graph showing variations of water absorption with passage of time in each case of the copolymer of MMA and PFPA, and a homopolymer of PMMA.

As shown in FIG. 3, as compared to PMMA, the copolymer of sample 22 can restrain increase in the amount of water absorption with the passing of time.

(Birefringence)

Monomer solutions prepared by using methyl methacrylate (MMA) and pentafluorophenyl methacrylate (PFPA), respectively, at the content ratios of MMA and PFPA, that is to say, MMA/PFPA=90/10, 80/20, 50/50 (wt %/wt %), were each charged into a sample tube. Added to each monomer solution was 0.3 wt % of n-butyl mercaptan (serving as a chain transfer agent), and 0.5 wt % of tert-buthylperoxy-2-ethylhexanate (serving as a polymerization initiator), and the resulting mixtures were each stirred and made homogeneous.

The obtained solutions were each filtered through a membrane filter (pore size: 0.2 μm) and charged into a glass test tube having an inner diameter of 18 mmφ. Each of the solution was subjected to polymerization in a hot water bath of 70° C. for 24 hours with the test tube being hermetically sealed, and thereafter, subjected to a polymerization and heat treatment in a constant temperature bath of 90° C. for 24 hours. Subsequently, the test tube was broken to take out the polymer.

Two surfaces of the obtained polymer solids having a cylindrical shape, which the surfaces are orthogonal to the central axis of the polymer, were subjected to grinding, and a polymer sample having the length of about 10 mm and the diameter of about 18 mmϕ was thereby formed. The photoelastic birefringence of this sample was measured by a birefringence measurement device (produced by Uniopt Corporation, Ltd.: Automatic birefringence measurement apparatus ABR-10A-EX), and the photoelastic constant was obtained.

Next, a polymer film sample used for measurement of an orientational birefringence was prepared. The polymer solids taken out from the aforementioned test tube were immersed in ethyl acetate that is fours times as much as the polymer in terms of weight ratio, and shaken by a shaker, so as to be completely dissolved therein. The obtained polymer solution was extended on a horizontal glass plate with a knife coater at a room temperature, and then dried for 24 hours. Subsequently, the dried film was peeled from the glass plate, and further dried in a reduced pressure drying machine of 60° C. for 24 hours, to remove most portions of the solvent.

A measurement film was cut out from the obtained polymer film having the thickness of about 40 μm, and placed on a dumbbell, and was subjected to uniaxial hot stretching using a tensile tester (Tensilon universal tester manufactured by ORIENTEC CO., LTD., Japan). At this time, the drawing temperature and the drawing velocity were adjusted, so that the degree of orientation of the polymer main chain was set to be 0.03. The degree of orientation of the polymer main chain in the film having been subjected to the drawing was measured by an infrared dichroism method, and it was conformed that the degree of orientation was 0.03.

Meanwhile, the method for measuring the degree of orientation of each of the main chain of a copolymer molecule and the main chain of a homopolymer using the infrared dichroism method can be referred to as scientific papers (by way of example, Akihiro Tagaya, Shuichi Iwata, Eriko Kawanami, Hisashi Tsukahara, and Yasuhiro Koike, Jpn. J. Appl. Phys. vol. 40, pp. 6117 to 6123 (2001)) and the like.

The orientational birefringence of the sample obtained by the drawing was measured by the birefringence measurement apparatus (manufactured by Uniopt Corporation, Ltd.; Automatic birefringence measurement apparatus ABR-10A-EX).

Figure 4:
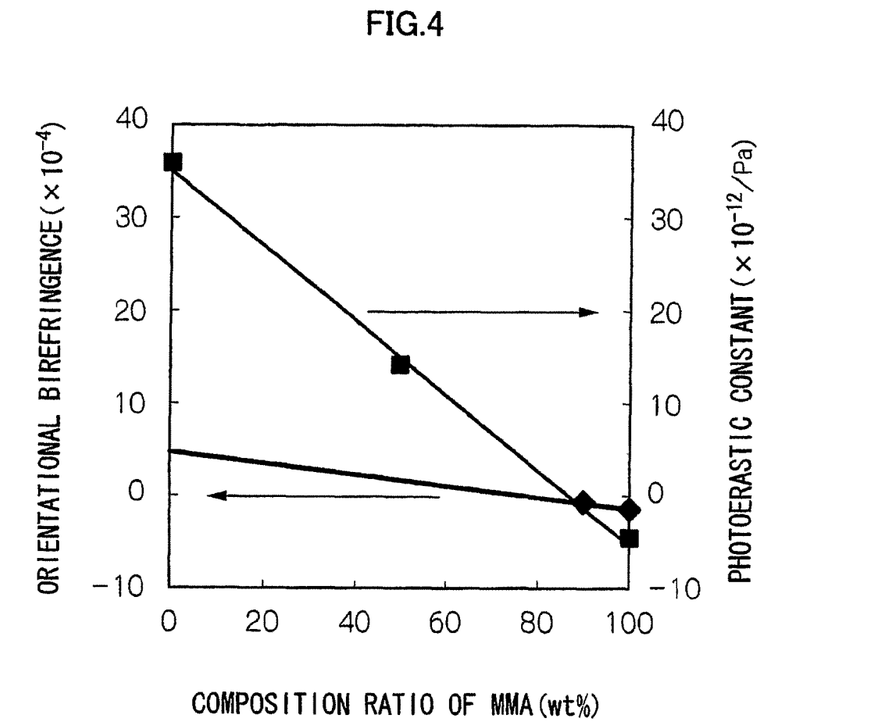
FIG. 4 is a graph showing the orientational birefringence and photoelastic constant of the MMA/PFPA copolymer when the feeding ratio of PFPA in the copolymer is changed in the embodiment.

The results are shown in FIG. 4. It can be seen from FIG. 4 that when the composition ratio of PFPA in the copolymer is 41.0 wt % or less, the absolute value of the orientational birefringence of the copolymer becomes lower than that of PMMA, and when the composition ratio of PFPA is 23.9 wt % or less, the absolute value of the photoelastic birefringence (photoelastic constant) of the copolymer becomes lower than that of PMMA. It can also be seen that in a case in which the composition ratio of the copolymer is set such that MMA/PFPA=about 80 wt %/about 20 wt %, the orientational birefringence becomes zero, and in a case in which the composition ratio of the copolymer is set such that MMA/PFPA=about 88 wt %/about 12 wt %, the photoelastic birefringence (photoelastic constant) becomes zero.

Reference Example

For consideration of a mechanism of increasing Tg in the copolymer, a copolymer of a fluorine-unsubstituted phenyl methacrylate (phMA) and MMA was prepared and Tg thereof was measured. Incidentally, the present invention is not limited to the aforementioned mechanism. Even when Tg of the copolymer increases irrespective of the mechanism, any copolymer represented by the aforementioned general formula (1) corresponds to the present invention.

Typically, it is estimated that the phenyl group is rigid and is more bulky than the methoxy group in PMMA, and therefore, in the copolymerization of MMA and phenyl methacrylate (phMA), the segmental movement of PMMA is decreased, thereby resulting in that Tg of the copolymer increases.

Figure 5A:
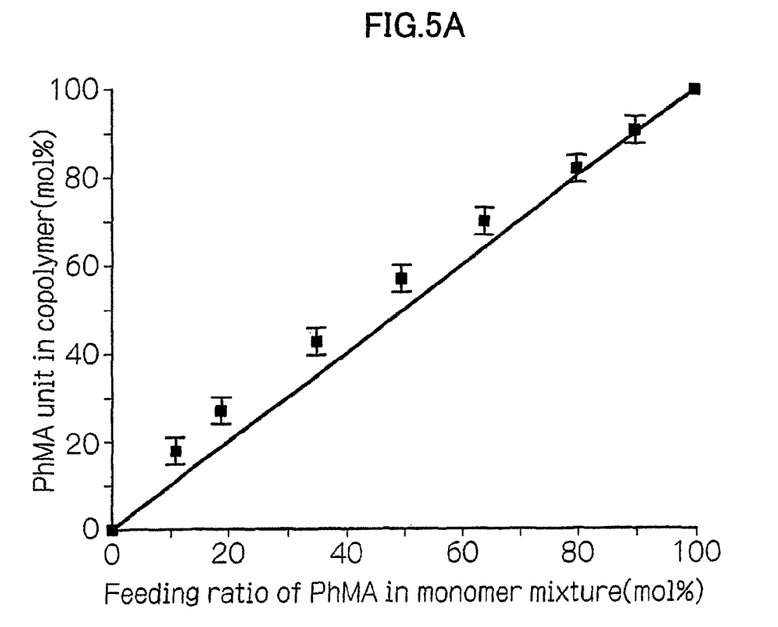
FIG. 5A is a graph showing the content ratio of phMA in the MMA/phMA copolymer when the feeding ratio of phMA in the copolymer is changed in a reference example.

Consequentially, Tg of a copolymer of MMA and phMA obtained by bulk polymerization was measured. The results are shown in FIGS. 5A and 5B.

The reactivity ratios, $r_1$ (phMA) and $r_2$ (MMA) were calculated as 1.18 and 0.65, respectively, and $r_1 r_2$ equals to 0.77. These results indicated that these monomers are used to obtain a random copolymer.

Figure 5B:
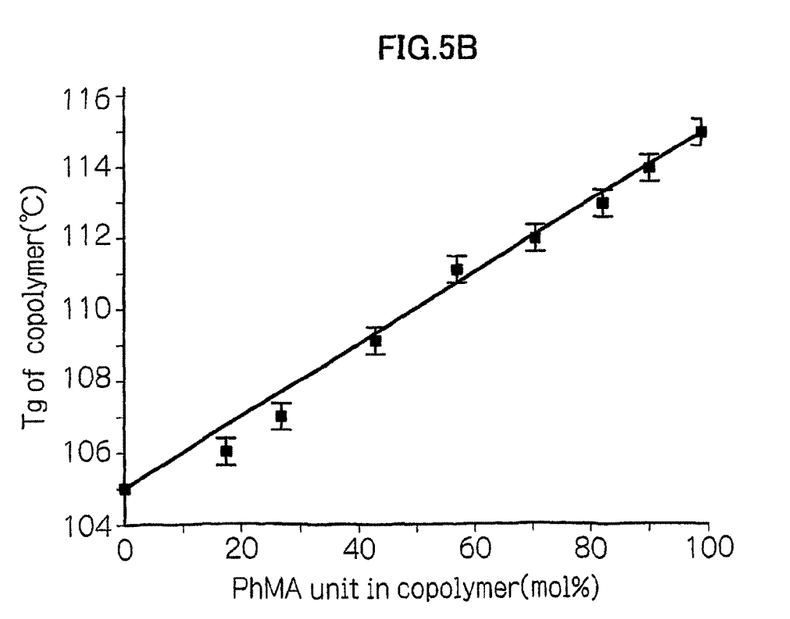
FIG. 5B is a graph showing variations of Tg of the MMA/phMA copolymer when the content ratio of phMA is changed in the reference example.

The results shown in FIG. 5B indicate that Tgs of the copolymers were linearly increased as the copolymerization ratio of phMA in the copolymer increases. This tendency is different from the case of using methacrylate monomers having the aforementioned fluorine-substituted aromatic group (refer to as FIG. 1B and FIG. 2B).

It is believed that the foregoing would result from that the fluorine-substituted phenyl group is a little bulkier than phenyl. However, when a much bulkier 2,6-diphenylphenyl methacrylate was copolymerized with MMA, Tg of the copolymer does not increase linearly. Thus, it is believed that the increase of Tg in the copolymer of the present invention may be due to some interaction between a fluorine atom and a carbonyl group, resulting from the phenyl group being substituted by a fluorine atom, thereby causing the segmental movement of polymers to increase.

The invention claimed is:

1. A liquid crystal display comprising an optical film, the optical film comprising a copolymer of (meth)acrylic ester represented by general formula (1) including the following repeating unit A and repeating unit B:

General formula (1)

wherein $R^1$ and $R^2$ each independently represent hydrogen atom or methyl group; $R^3$ represents an alkyl group having 1 to 4 carbon atoms; Y represents an atomic group forming an aromatic ring; x represents a number from 1 to n, and n represents the number of fluorine atoms which can be contained in the aromatic ring, wherein the repeating unit A is formed by methyl (meth)acrylate (MMA) and the repeating unit B is formed by pentafluorophenyl (meth)acrylate (PFPA) and the ratio of polymerization between MMA and PFPA is set such that MMA: PFPA=80 weight percent: 20 weight percent to 88 weight percent: 12 weight percent.

2. A phase contrast film comprising a copolymer of (meth)acrylic ester represented by general formula (1) including the following repeating unit A and repeating unit B:

General formula (1)

wherein $R^1$ and $R^2$ each independently represent hydrogen atom or methyl group; $R^3$ represents an alkyl group having 1 to 4 carbon atoms; Y represents an atomic group forming an aromatic ring; x represents a number from 1 to n, and n represents the number of fluorine atoms which can be contained in the aromatic ring, wherein the repeating unit A is formed by methyl (meth) acrylate (MMA) and the repeating unit B is formed by pentafluorophenyl (meth)acrylate (PFPA) and the ratio of polymerization between MMA and PFPA is set such that MMA: PFPA=80 weight percent: 20 weight percent to 88 weight percent: 12 weight percent.

3. A diffusion plate comprising a copolymer of (meth) acrylic ester represented by general formula (1) including the following repeating unit A and repeating unit B:

General formula (1)

wherein $R^1$ and $R^2$ each independently represent hydrogen atom or methyl group; $R^3$ represents an alkyl group having 1 to 4 carbon atoms; Y represents an atomic group forming an aromatic ring; x represents a number from 1 to n, and n represents the number of fluorine atoms which can be contained in the aromatic ring, wherein the repeating unit A is formed by methyl (meth) acrylate (MMA) and the repeating unit B is formed by pentafluorophenyl (meth)acrylate (PFPA) and the ratio of polymerization between MMA and PFPA is set such that MMA: PFPA=80 weight percent: 20 weight percent to 88 weight percent: 12 weight percent.

4. A light guide wave plate comprising a copolymer of (meth)acrylic ester represented by general formula (1) including the following repeating unit A and repeating unit B:

General formula (1)

wherein $R^1$ and $R^2$ each independently represent hydrogen atom or methyl group; $R^3$ represents an alkyl group having 1 to 4 carbon atoms; Y represents an atomic group forming an aromatic ring; x represents a number from 1 to n, and n represents the number of fluorine atoms which can be contained in the aromatic ring, wherein the repeating unit A is formed by methyl (meth) acrylate (MMA) and the repeating unit B is formed by pentafluorophenyl (meth)acrylate (PFPA) and the ratio of polymerization between MMA and PFPA is set such that MMA: PFPA=80 weight percent: 20 weight percent to 88 weight percent: 12 weight percent.

5. A prism sheet comprising a copolymer of (meth)acrylic ester represented by general formula (1) including the following repeating unit A and repeating unit B:

General formula (1)

wherein $R^1$ and $R^2$ each independently represent hydrogen atom or methyl group; $R^3$ represents an alkyl group having 1 to 4 carbon atoms; Y represents an atomic group forming an aromatic ring; x represents a number from 1 to n, and n represents the number of fluorine atoms which can be contained in the aromatic ring, wherein the repeating unit A is formed by methyl (meth) acrylate (MMA) and the repeating unit B is formed by pentafluorophenyl (meth)acrylate (PFPA) and the ratio of polymerization between MMA and PFPA is set such that MMA: PFPA=80 weight percent: 20 weight percent to 88 weight percent: 12 weight percent.

6. A light emitting diode (LED) comprising an optical film, the optical film comprising a copolymer of (meth)acrylic ester represented by general formula (1) including the following repeating unit A and repeating unit B:

General formula (1)

wherein $R^1$ and $R^2$ each independently represent hydrogen atom or methyl group; $R^3$ represents an alkyl group having 1 to 4 carbon atoms; Y represents an atomic group forming an aromatic ring; x represents a number from 1 to n, and n represents the number of fluorine atoms which can be contained in the aromatic ring, wherein the repeating unit A is formed by methyl (meth) acrylate (MMA) and the repeating unit B is formed by pentafluorophenyl (meth)acrylate (PFPA) and the ratio of polymerization between MMA and PFPA is set such that MMA: PFPA=80 weight percent: 20 weight percent to 88 weight percent: 12 weight percent.

* * * * *